(12) United States Patent
Wang et al.

(10) Patent No.: US 7,556,583 B2
(45) Date of Patent: Jul. 7, 2009

(54) PLANET CARRIER ASSEMBLY

(75) Inventors: Zhenrong Wang, Canton, MI (US); Hong Wai Nguyen, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 362 days.

(21) Appl. No.: 11/398,778

(22) Filed: Apr. 6, 2006

(65) Prior Publication Data
US 2007/0238575 A1    Oct. 11, 2007

(51) Int. Cl.
*F16H 57/08* (2006.01)

(52) U.S. Cl. ...................................................... 475/331
(58) Field of Classification Search ................. 475/331; 74/594.2
See application file for complete search history.

(56) References Cited
U.S. PATENT DOCUMENTS

| | | | | |
|---|---|---|---|---|
| 627,597 A | * | 6/1899 | Scott | 74/594.2 |
| 3,352,172 A | * | 11/1967 | Teichmann | 74/410 |
| 5,533,943 A | * | 7/1996 | Ichioka et al. | 475/198 |
| 5,934,155 A | * | 8/1999 | Lai | 74/594.1 |
| 6,568,296 B1 | * | 5/2003 | Lin | 74/594.1 |
| 6,929,578 B1 | * | 8/2005 | Rowell | 475/331 |
| 2004/0235610 A1 | * | 11/2004 | Jang et al. | 475/331 |

FOREIGN PATENT DOCUMENTS

| | | | |
|---|---|---|---|
| EP | 476395 A2 | * | 3/1992 |
| JP | 2004028293 A | * | 1/2004 |
| JP | 2004347107 A | * | 12/2004 |

* cited by examiner

*Primary Examiner*—Ha D. Ho

(57) ABSTRACT

A planet carrier assembly has staking pockets for retention of the pinion pins. The staking pockets are substantially rectangular when viewed from the top view but display a ramp angle when viewed from the side view. The shape of the pocket provides for improved pinion pin retention within the planet carrier side plate while reducing the required staking forces.

4 Claims, 4 Drawing Sheets

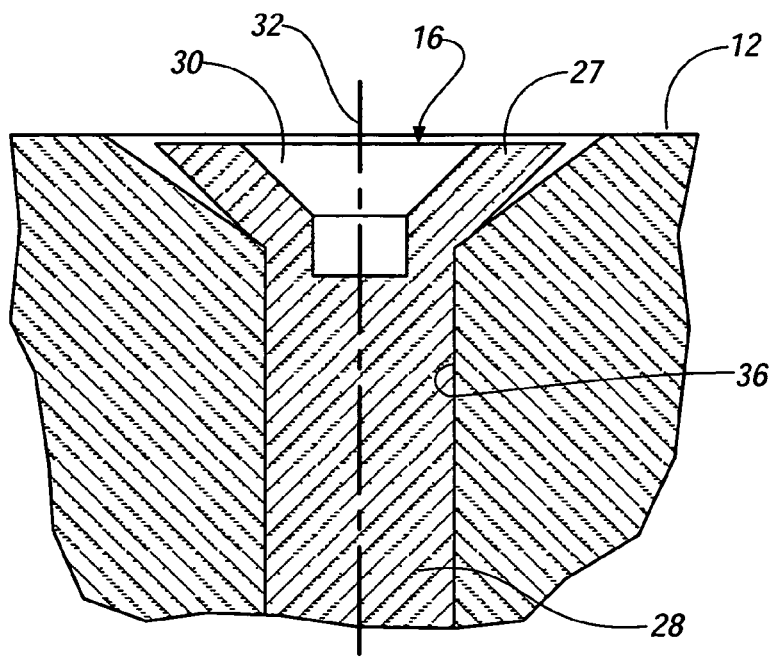
FIG. 4
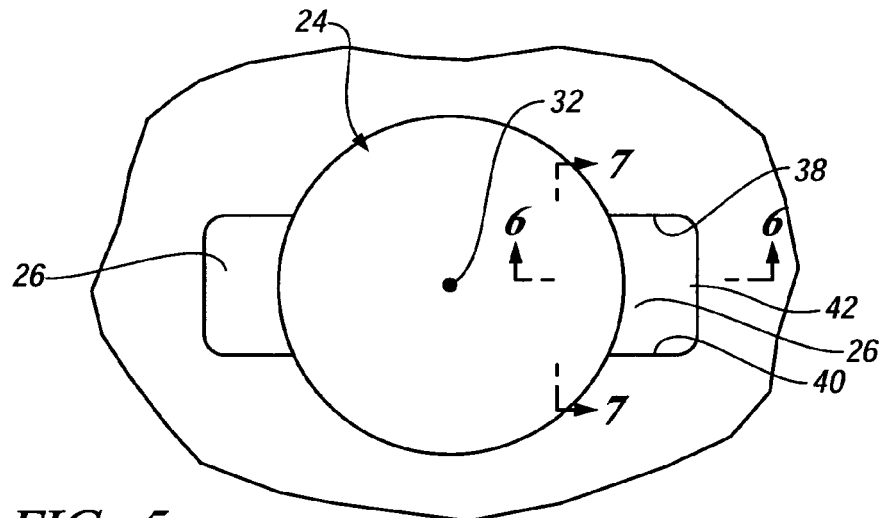
FIG. 5
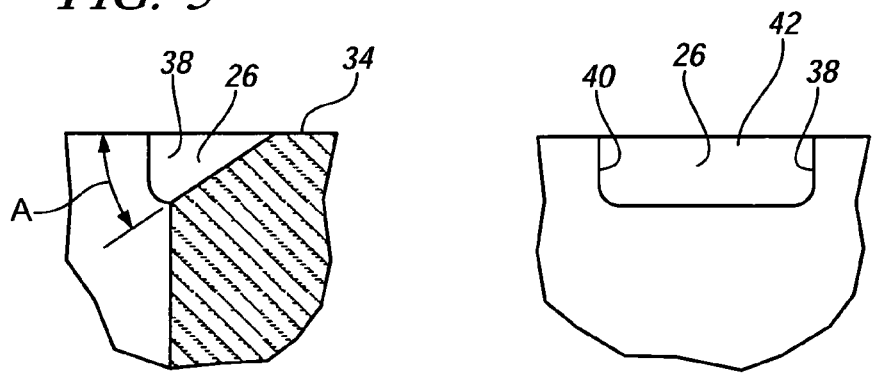
FIG. 6
FIG. 7

PLANET CARRIER ASSEMBLY

TECHNICAL FIELD

This invention relates to planet carriers for use in power transmissions and, more particularly, to the assembly of the planet carrier.

BACKGROUND OF THE INVENTION

Planet carriers are generally comprised of two side plates, which are interconnected by spacers and house a plurality of pinion gears. The pinion gears are rotatably mounted on needle bearings, which are supported on pins. The pins are secured in the planet carrier in a variety of ways including staking of the pinion pins to the carrier side plates.

SUMMARY OF THE INVENTION

It is an object of the present invention to provide an improved planet carrier assembly having improved staking of the pinion pins.

In one aspect of the present invention, staking pockets are formed in the side plates of the planet carrier having a substantially rectangular profile when viewed from the top or side.

In another aspect of the present invention, the staking pocket in the side plate has a ramp angle formed relative to a central axis of the pin opening formed in the side plate.

In still another aspect of the present invention, the ramp angle is formed within the range of twenty to ninety degrees relative to the central axis.

In yet another aspect of the present invention, the pinion pin is staked in two places by a staking tool, which has a staking angle formed thereon in the range of thirty to eighty degrees relative to the central axis of the pinion pin pocket.

In yet still another aspect of the present invention, the ramp angle is preferably disposed at forty-five degrees and the staking angle is within the range of thirty-five to sixty degrees.

DESCRIPTION OF THE DRAWINGS

FIG. 4 is a view partly in section of a pinion pin staked within the side plate.

FIG. 5 is a top view of a portion of a side plate showing the pinion pin opening and staking pocket.

FIG. 6 is a view taken along line 6-6 of FIG. 5.

FIG. 7 is a view taken along line 7-7 of FIG. 5.

DESCRIPTION OF AN EXEMPLARY EMBODIMENT

Figure 1:
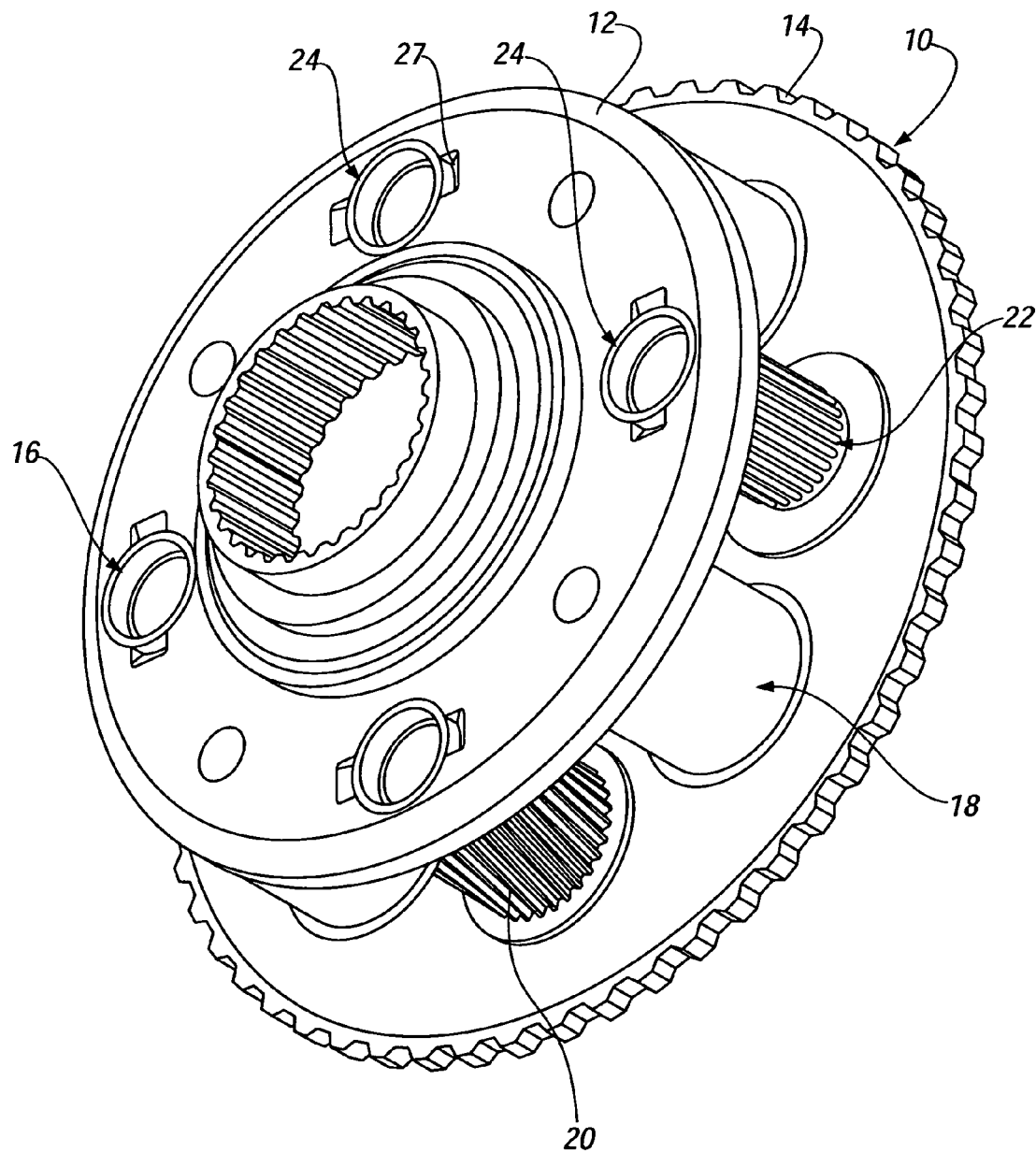
FIG. 1 is an isometric view of a planet carrier assembly incorporating the present invention.
Figure 2:
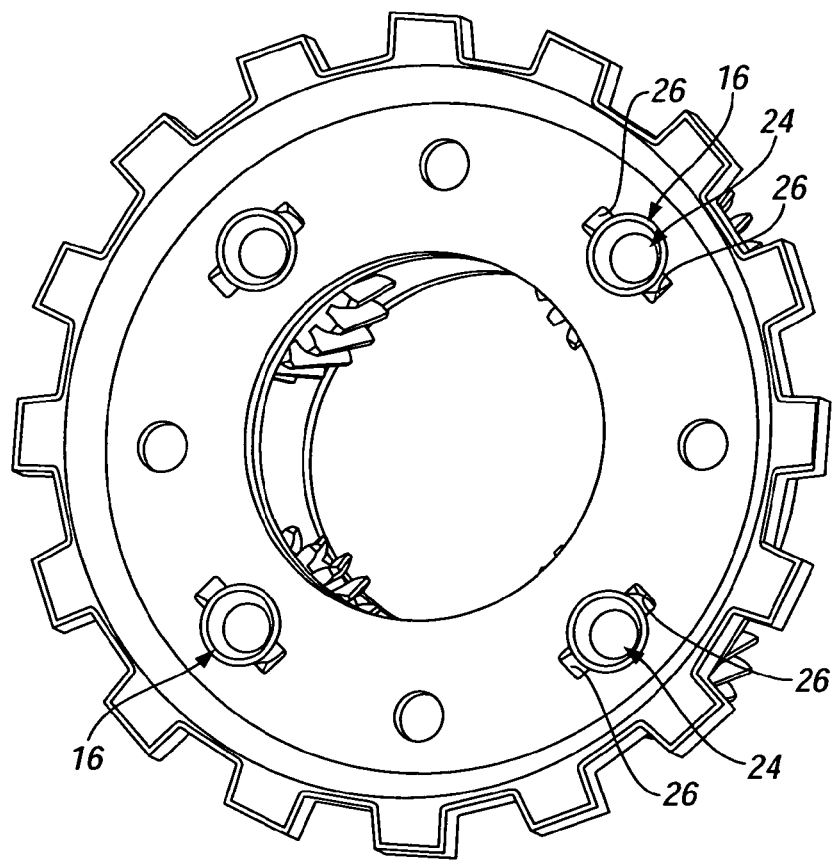
FIG. 2 is a top view of a planet carrier assembly incorporating the present invention.
Figure 3:
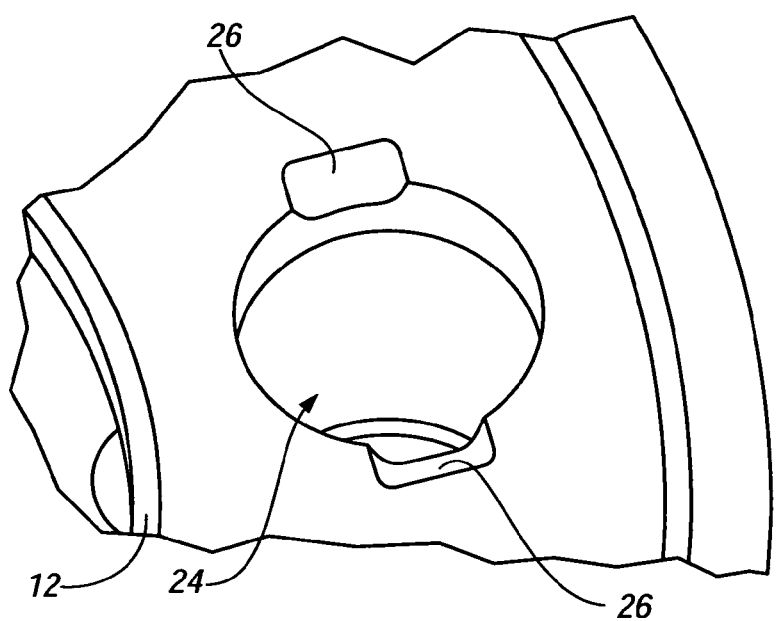
FIG. 3 is an isometric view of a portion of a planet carrier side plate showing the staking pockets formed therein.

Referring to the drawings, wherein like characters represent the same or corresponding parts throughout the several views, there is shown in FIG. 1 a planet carrier assembly generally designated 10. The planet carrier assembly 10 has two side plates 12 and 14, a plurality of pinion pins 16, a plurality of spacer members 18, a bearing 22 disposed about each pinion pin 16, and a planetary pinion gear 20 rotatably mounted on each bearing 22.

Figure 8:
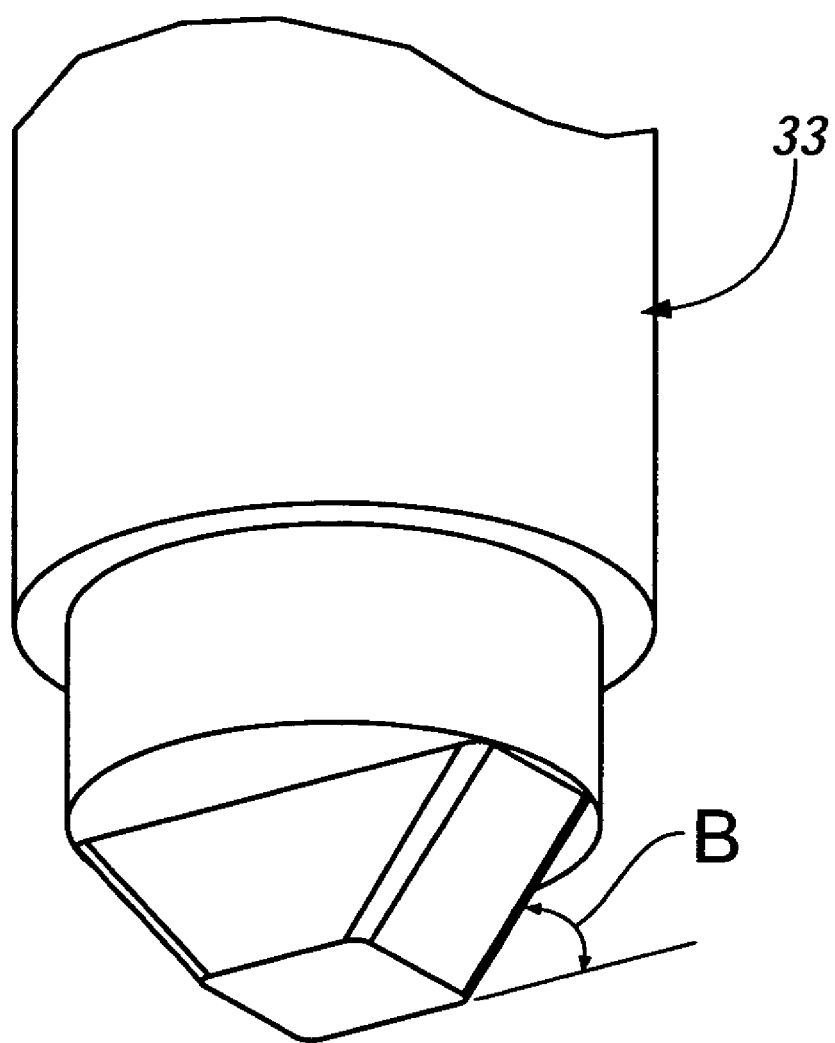
FIG. 8 is an isometric view of a staking tool, which can be used with the present invention.

The side plate 12, as seen in FIGS. 1, 2, 3, 5, 6, and 7, has formed therein a plurality of pinion apertures 24. Each aperture 24 has formed on the outer periphery thereof two staking pockets 26. The staking pockets 26 excess matter displaced from the pinion pins 16 as seen in FIG. 4. A portion 27 of an outer end portion 30 of the pinion pins 16 is displaced radially outward into each of the pockets 26. The pinion pin 16 has a solid core 28 and the tubular end portion 30. In the alternative, the pinion pin 16 may be entirely tubular. A staking tool 33, as seen in FIG. 8, is employed to displace the portion 27 radially outward into each of the respective staking pockets 26.

As best seen in FIGS. 5, 6, and 7, the staking pockets 26 are formed in the outer periphery of each aperture 24 and are symmetrical about a centerline or central axis 32 of the aperture 24. Each of the staking pockets 26, when viewed from the top as seen in FIG. 5, is a substantially rectangular area, however, when viewed in a side view as shown in FIG.6, there is a ramp angle A, which extends from an outer surface 34 to an inner periphery 36 of the aperture 24. The bottom of the pocket 26 is essentially a plane, which intersects the central axis 32 of the pinion pin 28 and the aperture 24 at an angle in the range of 20 to 90 degrees. The preferred angle is 45 degrees. The pocket 26 has side walls 38, 40 and a back edge 42. When viewed from either the top view (FIG. 5) or the side view (FIG. 6) a rectangular area is presented to the viewer.

The side plate 12 and the side plate 14 are powdered metal components, which as is well known, permits the features therein such as the aperture 26 to be net formed at the pressing process. However, it is also known that powdered metal has a low ductility and therefore the amount of interference fit and/or staking deformation must be less than the more conventional steel carrier. The pins 16 are press fit into the side plates 12 and 14 within the permissible standards of powdered metal technology and the deformation force employed to displace the metal of pin 16 into the staking pockets 26 is within the specifications for powdered metal treatment.

The shape of each pocket 26 provides for better and improved retention force of the pinion pin relative to the side plate. The pinion pin has two forces imposed thereon, one of which tends to push the pinion pin out of the pocket, and this is caused mostly by the helical gear surfaces and the forces on the needle bearing, and the other is the torsional force which is transmitted through the pinion pins when the carrier is under load. By providing the rectangular shaped pockets and an optimum ramp angle, more metal is provided to resist these forces.

The staking pocket angle A is designed to be within the range of twenty to ninety degrees and is ideally designed at forty-five degrees. However, the other angles within the range are permissible. The staking tool 33, shown in FIG. 8, has a substantially truncated trapezoidal shape having a side angle B, which deforms the metal of pin 16 into the staking pockets 26. The rectangular shape of the pocket 26 permits increased contact between the staked material and the side plates.

When compared with prior art staking pockets, which are generally circular and/or V-shaped, the present invention provides a larger interface between the staked portion of pin 16 and the side plates 12 and 14. The prior art therefore needs either higher staking forces or a material other than powdered metal to be employed in the carrier assembly. Use of higher staking forces is limited by the ductility and/or strength of the powdered metal material. Therefore, generally higher staking forces require any material other than powdered metal, such as steel, which is a more costly component to be employed.

The invention claimed is:

1. A planet carrier assembly having a plurality of pinion pin openings into each of which a pinion pin is press fit to support a bearing mechanism; each pinion pin having a staking area which is expanded outwardly into staking pockets formed in a carrier side plate; said staking pocket having opposing side walls, a back edge, and a base having a planar angular base surface, wherein said planar angular base surface of said pocket is disposed within a plane which intersects a central axis of each pinion pin opening and said plane intersects said central axis at approximately 45 degrees.

2. The planet carrier assembly defined in claim 1 further wherein said carrier side plate is a powder metal component.

3. The planet carrier assembly defined in claim 1 further wherein said pinion pin has a core portion that is solid and an end portion that is tubular.

4. The planet carrier assembly defined in claim 1 further wherein said pinion pin is entirely tubular.

* * * * *